(12) United States Patent  
Cok et al.

(10) Patent No.: US 8,619,005 B2
(45) Date of Patent: Dec. 31, 2013

(54) SWITCHABLE HEAD-MOUNTED DISPLAY TRANSITION

(75) Inventors: Ronald S. Cok, Rochester, NY (US); John N. Border, Walworth, NY (US); Sen Wang, Rochester, NY (US); Elena A. Fedorovskaya, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 673 days.

(21) Appl. No.: 12/878,250

(22) Filed: Sep. 9, 2010

(65) Prior Publication Data

US 2012/0062444 A1    Mar. 15, 2012

(51) Int. Cl.
 *G09G 5/00*   (2006.01)
 *G06F 3/041*  (2006.01)
(52) U.S. Cl.
 USPC ............................................. 345/8; 345/178
(58) Field of Classification Search
 USPC ............. 345/8, 629, 698, 173, 174, 178, 211, 345/212, 419
 See application file for complete search history.

(56) References Cited

U.S. PATENT DOCUMENTS

| 6,184,847 | B1 | 2/2001 | Fateh et al. | |
| 6,497,649 | B2 | 12/2002 | Parker et al. | |
| 6,829,095 | B2 | 12/2004 | Amitai | |
| 6,847,336 | B1* | 1/2005 | Lemelson et al. | 345/8 |
| 7,710,655 | B2 | 5/2010 | Freeman et al. | |
| 2002/0044152 | A1* | 4/2002 | Abbott et al. | 345/629 |
| 2007/0237491 | A1 | 10/2007 | Kraft | |
| 2010/0107066 | A1 | 4/2010 | Hiltola et al. | |

OTHER PUBLICATIONS

Nelson et al, Assessing simulator sickness in a see-through HMD effects of time dealy, time on task and task complexity, Image 2000 Conf. Proceedings, Scottsdale, AZ Jul. 2000.

* cited by examiner

*Primary Examiner* — Michael Faragalla
(74) *Attorney, Agent, or Firm* — Raymond L. Owens

(57) ABSTRACT

A method of operating a switchable head-mounted display apparatus includes the steps of providing a head-mounted display that includes a switchable viewing area that is switched between a transparent viewing state and an information viewing state, switching the viewing state to an intermediate state from the transparent viewing state or the information viewing state, and switching the intermediate state to the transparent viewing state or the information viewing state.

24 Claims, 16 Drawing Sheets

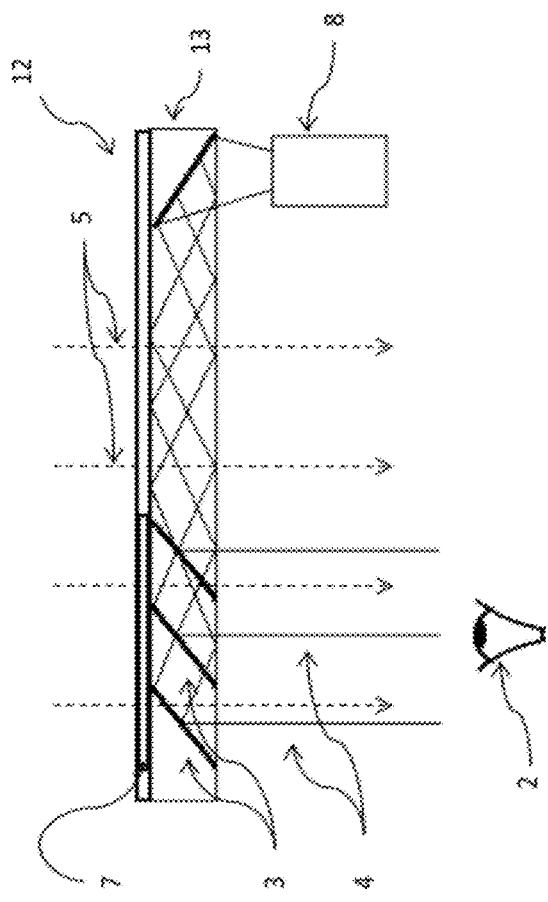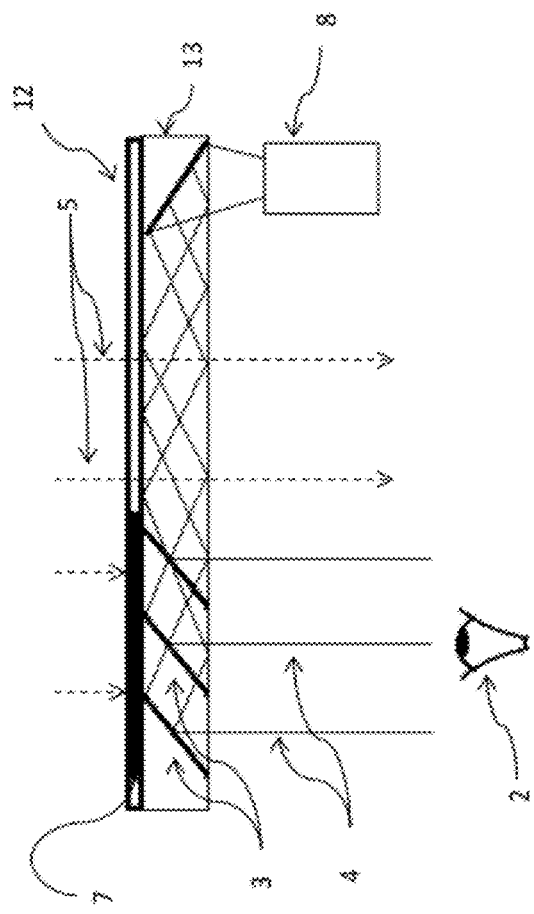
PRIOR ART
FIG. 2A
PRIOR ART
FIG. 2B

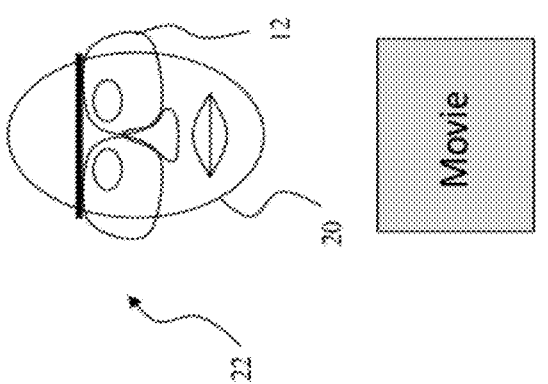
FIG. 4A
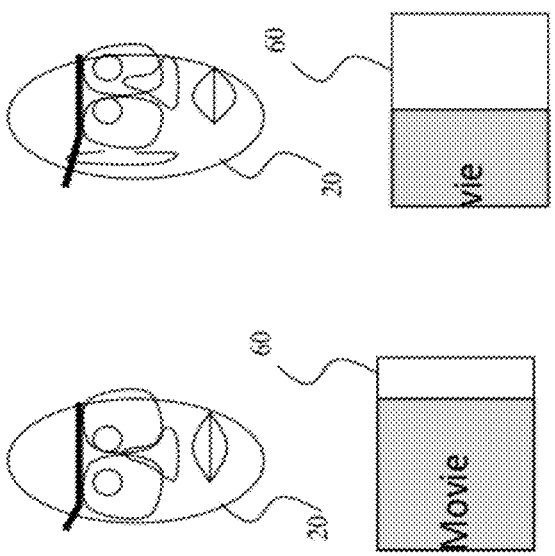
FIG. 4B   FIG. 4C   FIG. 4D
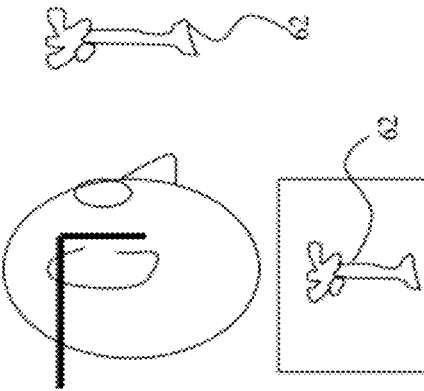
FIG. 4E
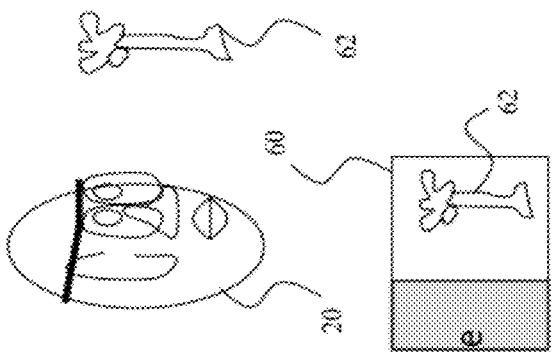

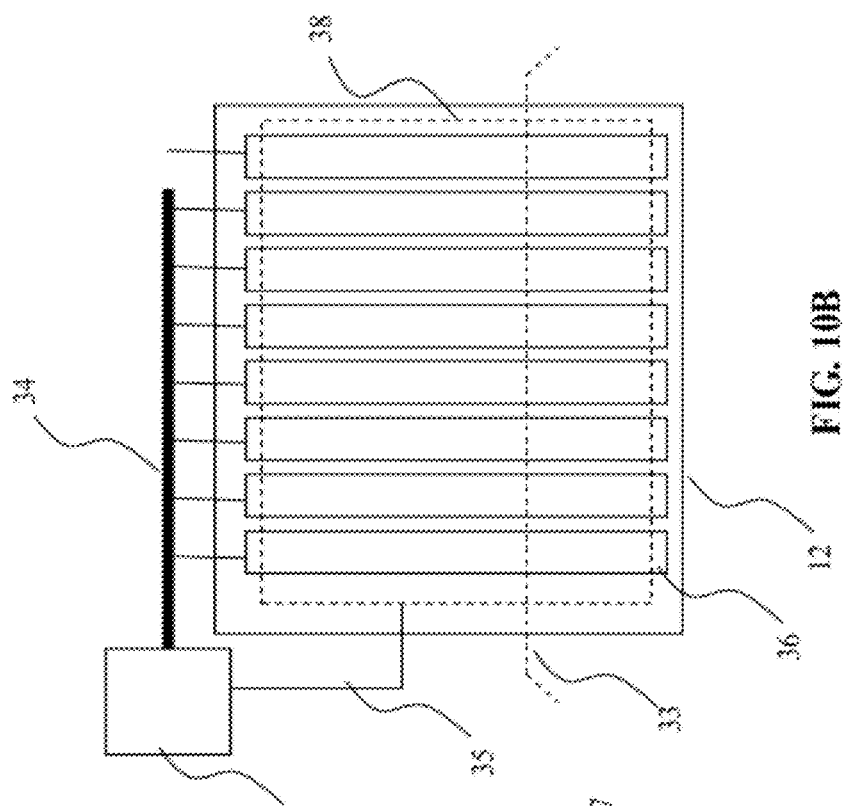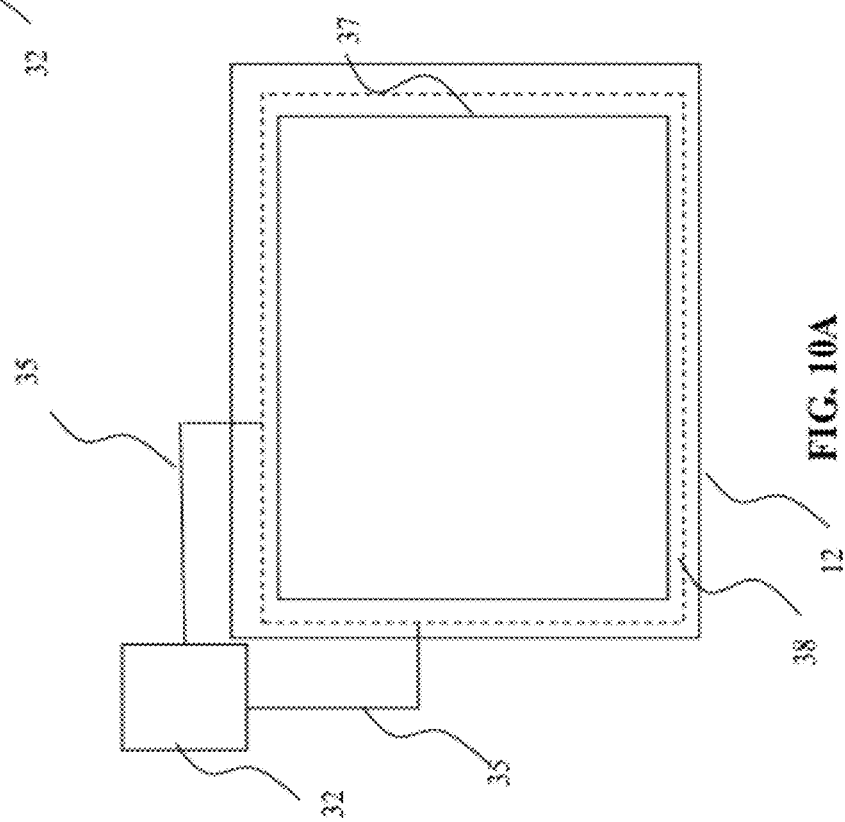

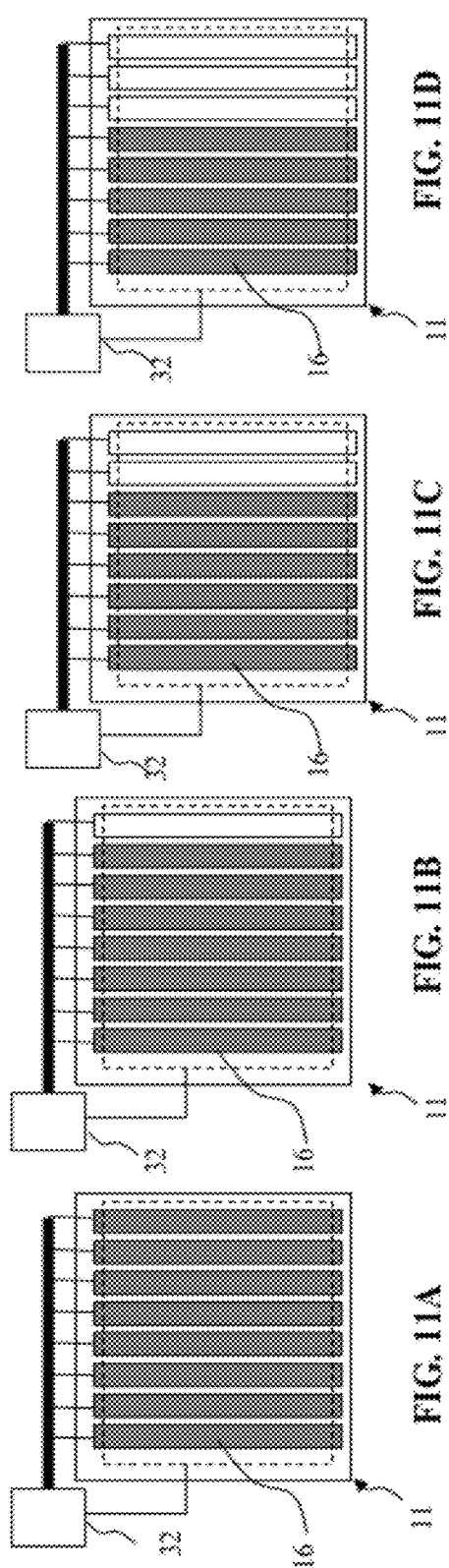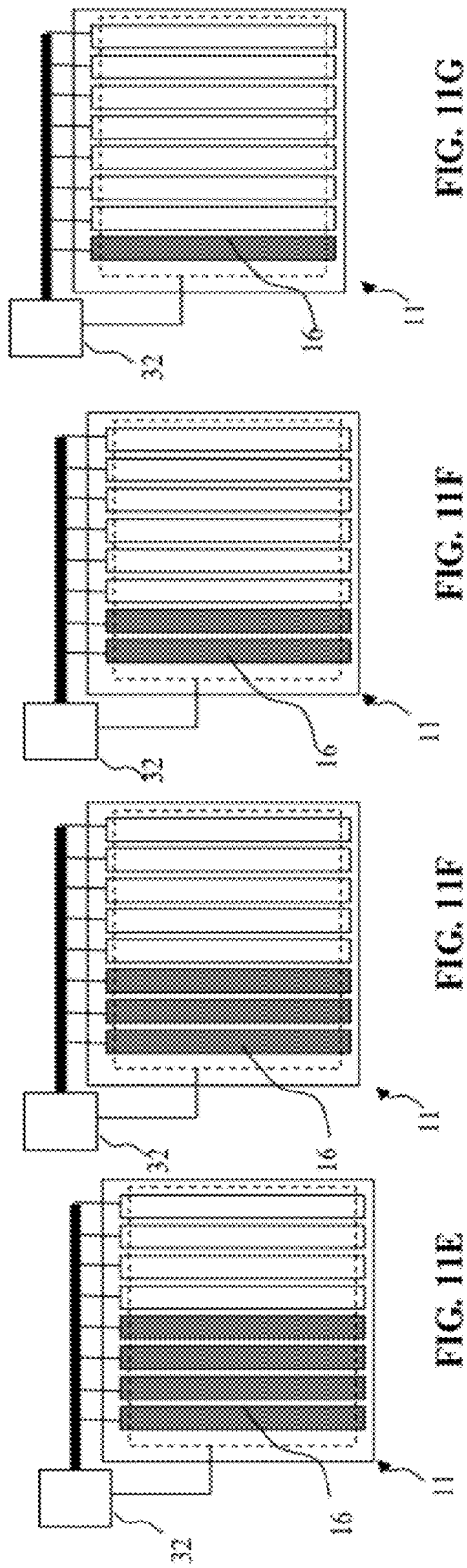

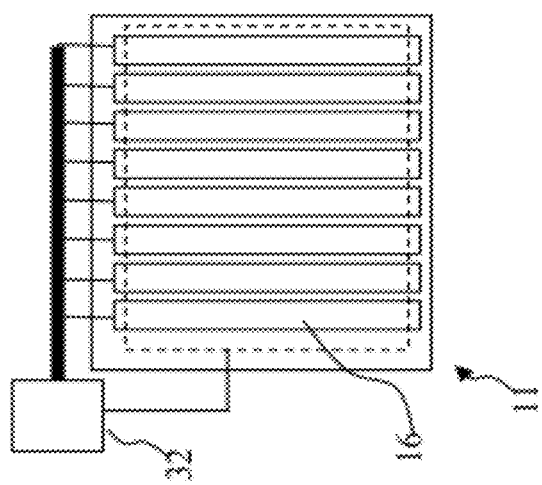

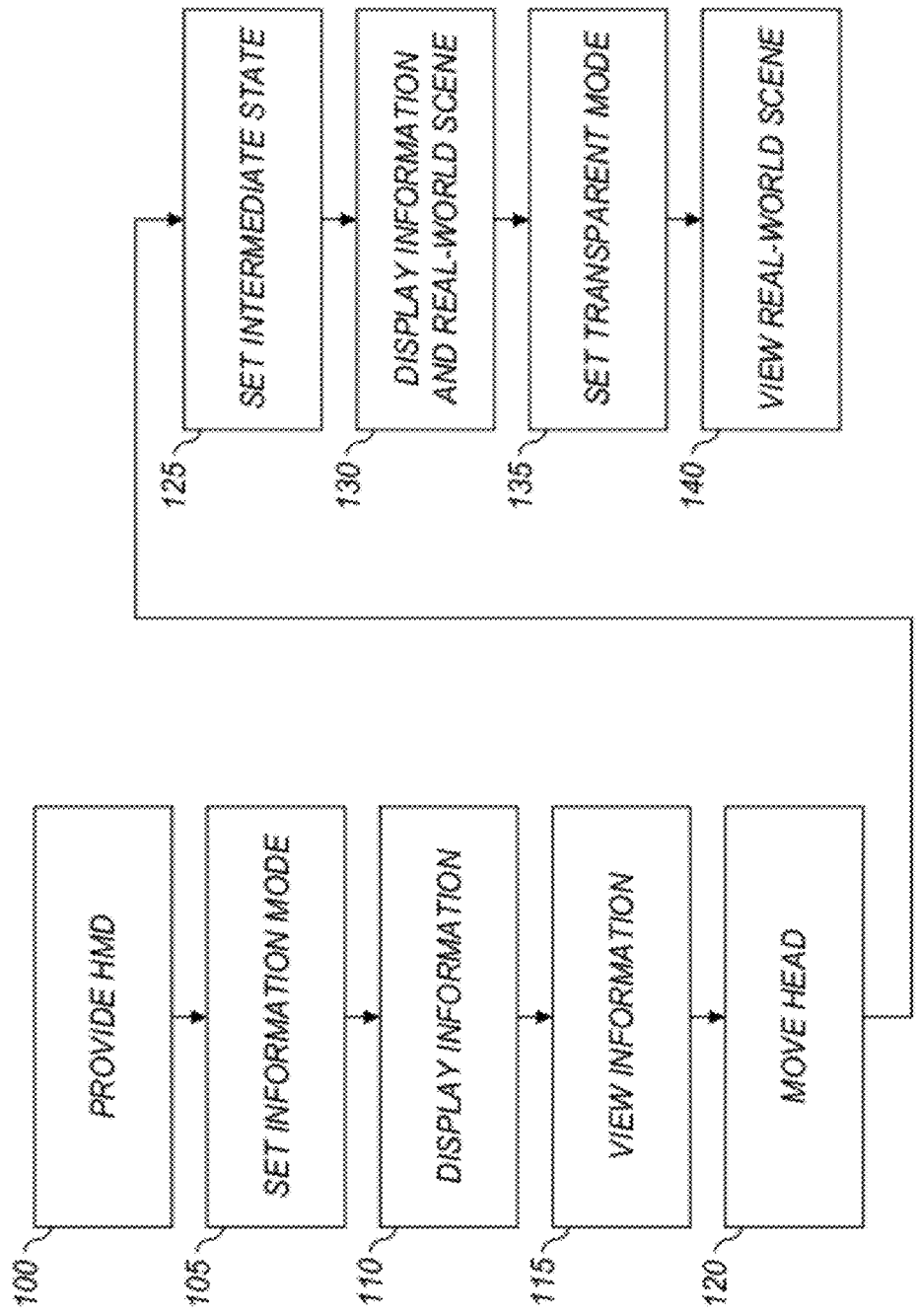

SWITCHABLE HEAD-MOUNTED DISPLAY TRANSITION

CROSS REFERENCE TO RELATED APPLICATIONS

Reference is made to commonly assigned U.S. patent application Ser. No. 12/862,978 filed Aug. 25, 2010, entitled "Head-Mounted Display Control by John N. Border et al; U.S. patent application Ser. No. 12/862,985 filed Aug. 25, 2010, entitled "Head-Mounted Display With Biological State Detection" by John N. Border et al; U.S. patent application Ser. No. 12/862,998 filed Aug. 25, 2010, entitled "Head-Mounted Display With Eye State Detection" by John N. Border et al, U.S. patent application Ser. No. 12/868,013 filed Aug. 25, 2010, entitled "Head-Mounted Display With Environmental State Detection" by John N. Border et al, and U.S. patent application Ser. No. 12/862,994 filed Aug. 25, 2010, entitled "Switchable Head-Mounted Display" by John N. Border et al, the disclosures of which are incorporated herein.

FIELD OF THE INVENTION

The present invention relates to a head-mounted display. More particularly, the present invention relates to a control method for reducing motion sickness when using such a display in response to an external stimulus.

BACKGROUND OF THE INVENTION

Head-mounted displays are widely used in gaming and training applications. Such head-mounted displays typically use electronically controlled displays mounted on a pair of glasses or a helmet with supporting structures such as ear, neck, or head pieces that are worn on a user's head. Displays are built into the glasses together with suitable optics to present electronic imagery to a user's eyes.

Most head-mounted displays provide an immersive effect in which scenes from the real world are obscured and the user can see, or is intended to see, only the imagery presented by the displays. In the present application, immersive displays are considered to be those displays that are intended to obscure a user's view of the real world to present information to the user from the display. Immersive displays can include cameras to capture images of the scene in front of the user so that this image information can be combined with other images to provide a combined image of the scene where portions of the scene image have been replaced to create a virtual image of the scene. In such an arrangement, the display area is opaque. Such displays are commercially available, for example from Vuzix Corporation.

Alternatively, some head-mounted displays provide a see-through display for an augmented-reality view in which real-world scenes are visible to a user with additional image information overlaid on the real-world scenes. Such an augmented-reality view is provided by helmet-mounted displays found in military applications and by heads-up displays (HUDs) in the windshields of automobiles. In this case, the display area is transparent. FIG. 1 shows a typical prior-art head-mounted display 10 that is a see-through display in a glasses format. The head-mounted display 10 includes: ear pieces 14 to locate and support the device on the user's head; lens areas 12 that have variable occlusion members 7; microprojectors 8 and control electronics 9 to provide images to at least the variable occlusion members 7.

U.S. Pat. No. 6,829,095 describes a device with a see-through display 10 or augmented-reality display in a glasses format where image information is presented within the lens areas 12 of the glasses. The lens areas 12 of the glasses in this patent include waveguides to carry the image information to be displayed from an image source, with a built-in array of partially reflective surfaces to reflect the information out of the waveguide in the direction of the user's eyes 2. FIG. 2A shows a cross-section of the lens area 12 including: a waveguide 13; partial reflectors 3 along with; the microprojector 8 to supply a digital image; light rays 4 passing from the microprojector 8, through the waveguide 13, partially reflecting off the partial reflectors 3 and continuing on to the user's eye 2. As seen in FIG. 2A, light rays 5 from the ambient environment pass through the waveguide 13 and partial reflectors 3 as well as the transparent surrounding area of the lens area 12 to combine with the light 4 from the microprojector 8 and continue on to the user's eye 2 to form a combined image. The combined image in the area of the partial reflectors 3 is extra bright because light is received by the user's eye 2 from both the microprojector 8 and light rays 5 from the ambient environment. A reflectance of 20% to 33% is suggested in U.S. Pat. No. 6,829,095 for the partial reflectors 3 to provide a suitable brightness of the image information when combined with the image of the scene as seen in the see-through display. Because the array of partial reflectors 3 is built into the waveguide 13 and the glasses lens areas 12, the reflectance of the partial reflectors 3 should be selected during manufacturing and is not adjustable. Combined images produced with this method are of a low image quality that is difficult to interpret as shown in FIG. 4.

U.S. Patent Application Publication No. 2007/0237491 presents a head-mounted display that can be changed between an opaque mode where image information is presented and a see-through mode where the image information is not presented and the display is transparent. This mode change is accomplished by a manual switch that is operated by the user's hand or a face muscle motion. This head-mounted display is either opaque or fully transparent. Motion sickness or simulator sickness is a known problem for immersive displays because the user cannot see the environment well. As a result, motion on the part of a user, for example head motion, does not correspond to motion on the part of the display or imagery presented to the user by the display. This is particularly true for displayed video sequences that incorporate images of moving scenes that do not correspond to a user's physical motion. U.S. Pat. No. 6,497,649 discloses a method for reducing motion sickness produced by head movements when viewing a head-mounted immersive display. The patent describes the presentation of a texture field surrounding the displayed image information, wherein the texture field is moved in response to head movements of the user. This patent is directed at immersive displays.

Motion sickness is less of an issue for augmented reality displays since the user can see the environment better. However, the imaging experience is not suitable for viewing high-quality images such as movies with a see-through display due to competing image information from the external scene and a resulting degradation in contrast and general image quality. Aspects of the problem of motion sickness associated with helmet mounted see-through displays is described in the paper "Assessing simulator sickness in a see-through HMD: effects of time delay, time on task and task complexity" by W. T. Nelson, R. S. Bolia, M. M. Roe and R. M. Morley; Image 2000 Conf, Proceedings, Scottsdale, Ariz., July 2000. In this paper, the specific problem of image movement lagging behind the head movement of the user is investigated as a cause of motion sickness.

U.S. Pat. No. 7,710,655 describes a variable occlusion member that is attached to the see-through display as a layer in the area that image information is presented by the display. The layer of the variable occlusion member is used to limit the ambient light that passes through the see-through display from the external environment. The variable occlusion layer is adjusted from dark to light in response to the brightness of the ambient environment to maintain desirable viewing conditions. FIG. 1 shows the variable occlusion member 7 located in the center of the lens area 12 wherein the variable occlusion member 7 is in a transparent state. FIG. 2A shows the variable occlusion member 7 wherein, the variable occlusion member 7 is in a darkened state. Similarly, FIG. 2A shows a cross-section of the variable occlusion member 7 in relation to the waveguide 13 and the partial reflectors 3 wherein the variable occlusion member 7 is in a transparent state. FIG. 2B shows the cross-section wherein the variable occlusion member 7 is in a darkened state so that light rays 5 from the ambient environment are blocked in the area of the variable occlusion member 7 and light rays 5 from the ambient environment only pass through the transparent surrounding area of lens area 12 to continue on the user's eye 2. As a result, the combined image seen by the user is not overly bright in the area of the variable occlusion member 7 because only light from the microprojector 8 is seen in that area. FIG. 3 illustrates the variable occlusion member 7 in a dark state. FIG. 5 shows an illustration of the combined image as seen by the user where the variable occlusion member 7 is in a darkened state, as in FIG. 3. Although image quality is improved by the method of U.S. Pat. No. 7,710,655, compensating for head movement of the user to provide further improved image quality and enhanced viewing comfort is not considered.

There is a need, therefore, for an improved head-mounted display that enables viewing of high quality image information with reduced motion sickness and improved viewing comfort for the user.

SUMMARY OF THE INVENTION

In accordance with the present invention, there is provided a method of operating a switchable head-mounted display apparatus, including the steps of:

providing a head-mounted display, the head-mounted display including a switchable viewing area that is switched between a transparent viewing state and an information viewing state, wherein:
   i) the transparent viewing state is transparent so that a user of the head-mounted display views at least a portion of the scene outside the head-mounted display in the user's line of sight; and
   ii) the information viewing state is opaque and the user views information displayed in the switchable viewing; and switching the viewing state to an intermediate state from the transparent viewing state or the information viewing state; and switching the intermediate state to the transparent viewing state or the information viewing state.

The present invention provides an improved head-mounted display that enables viewing of both high-quality image information and direct views of real-world scenes with reduced motion sickness and improved viewing comfort for the user.

BRIEF DESCRIPTION OF THE DRAWINGS

The above and other objects, features, and advantages of the present invention will become more apparent when taken in conjunction with the following description and drawings, wherein identical reference numerals have been used, where possible, to designate identical features that are common to the figures, and wherein:

FIG. 2A is a schematic of a cross-section of a prior-art lens area of the heads-up display and the associated light from the microprojector and from the ambient environment with a variable occlusion member in a transparent state;

FIG. 2B is a schematic of a cross-section of a prior-art lens area of the heads-up display and the associated light from the microprojector and from the ambient environment with a variable occlusion member in a darkened state;

FIGS. 4A to 4E are successive illustrations of a user's head position and the corresponding images as the user's head rotates about a vertical axis according to an embodiment of the present invention;

FIGS. 10A, 10B, and 10C are schematics of multiple independently controllable regions in a switchable viewing area that are a series of rectangular shaped areas spanning the height of switchable viewing area;

FIGS. 11A-11H illustrate successive stages in controlling spatially adjacent independently controllable switchable viewing areas from one state to a different state according to an embodiment of the present invention;

FIG. 12 is a flow chart illustrating a method according to an embodiment of the present invention;

Figure 1:
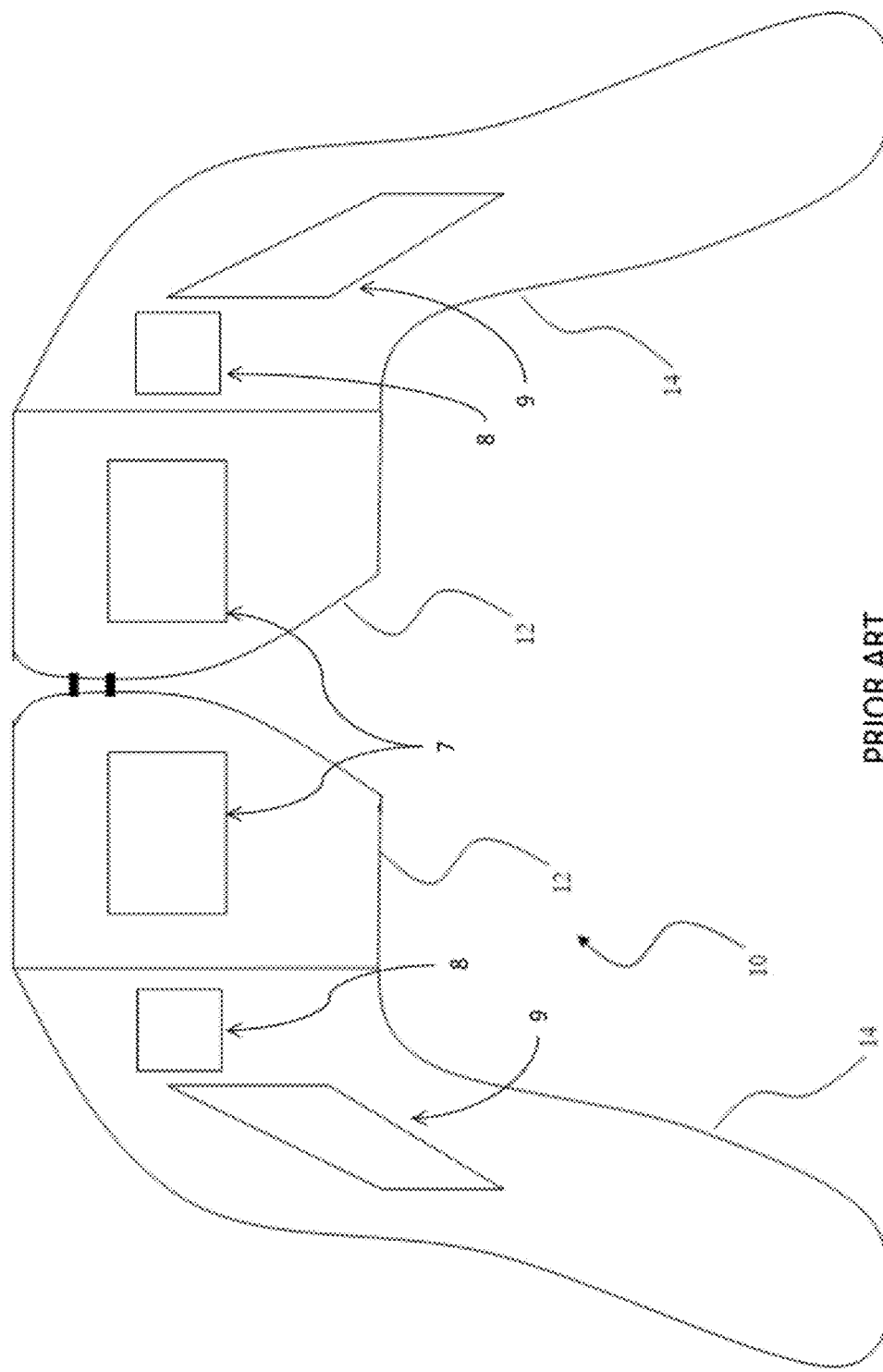
FIG. 1 is an illustration of a prior-art heads-up display with a variable occlusion member in a transparent state.
Figure 3:
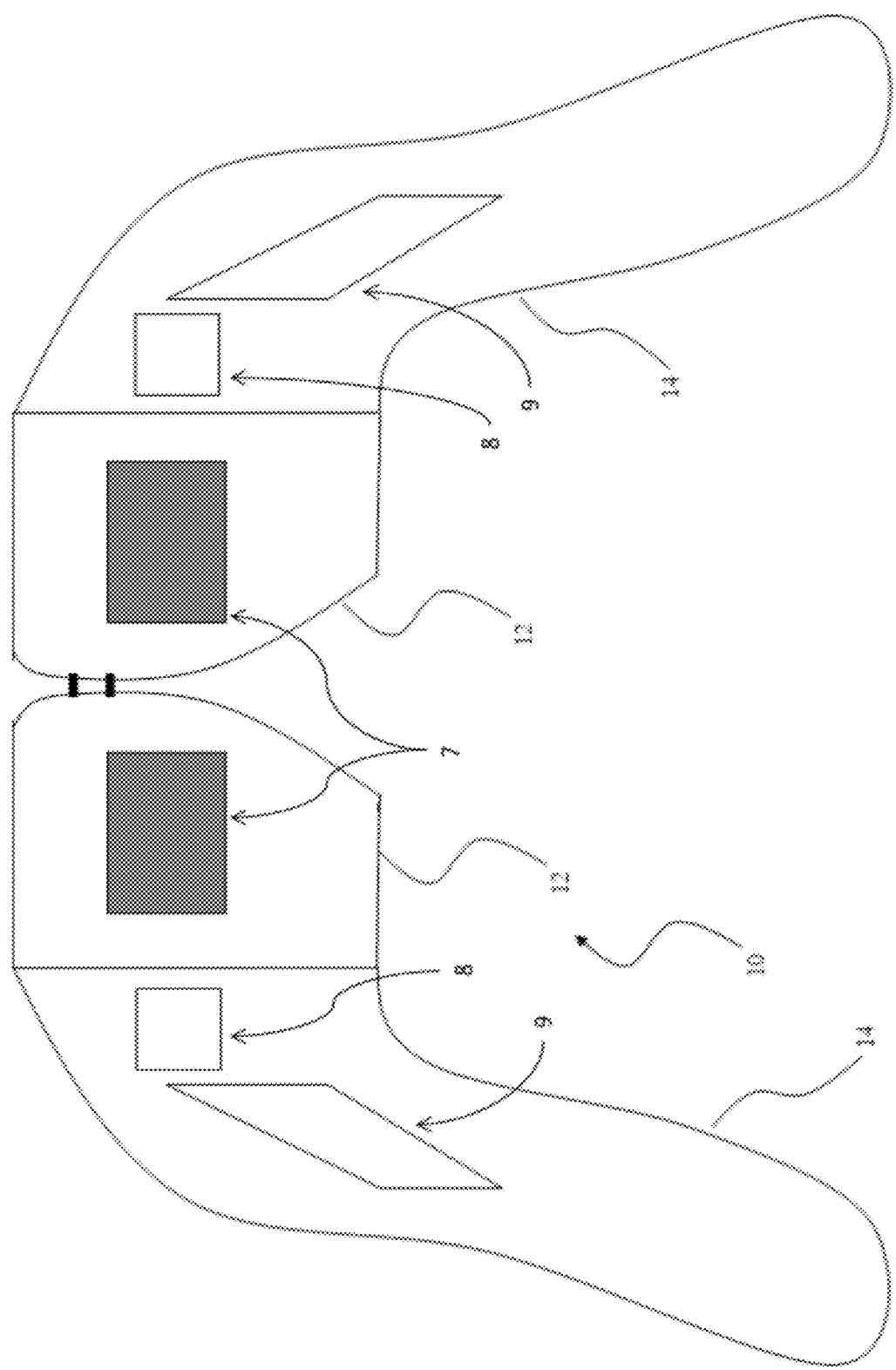
FIG. 3 is an illustration of a prior-art heads-up display with a variable occlusion member in a darkened state.
Figure 5B:
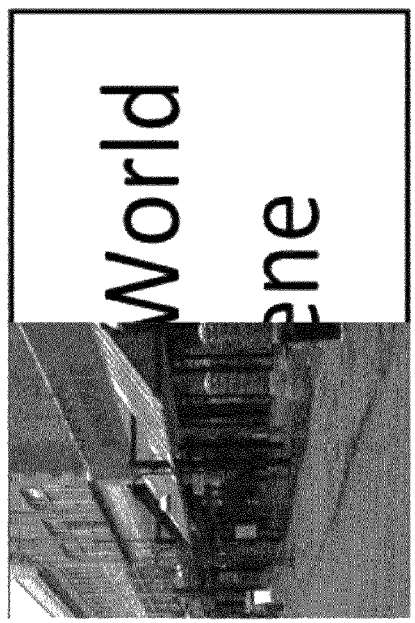
FIGS. 5A to 5D are successive illustrations of combined information and a real-world scene as seen by a user as the user's head rotates about a vertical axis according to an embodiment of the invention.
Figure 5D:
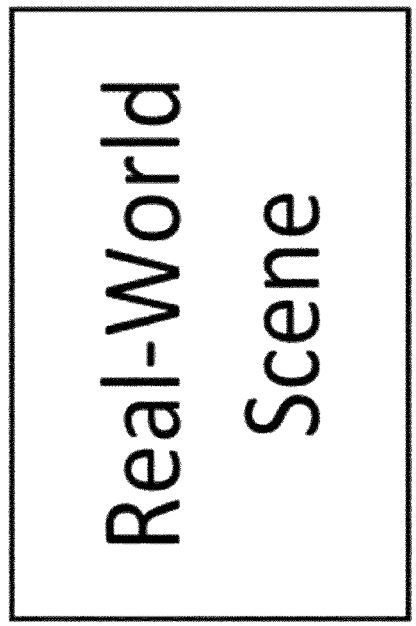
Figure 5A:
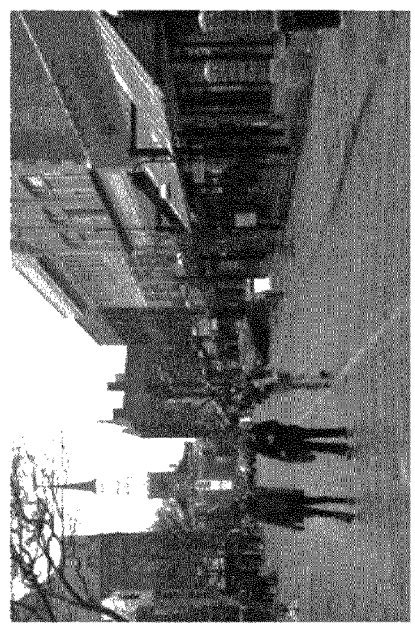
Figure 5C:
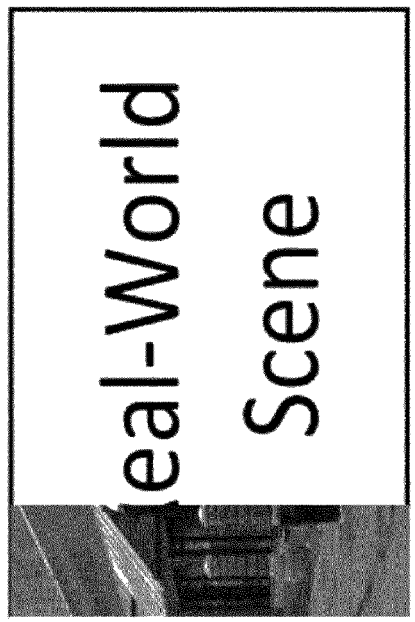

Because the various layers and elements in the drawings have greatly different sizes, the drawings are not to scale.

DETAILED DESCRIPTION OF THE INVENTION

A wide variety of head-mounted displays 10 are known in the art. The head-mounted displays 10 include a microprojector 8 or image scanner to provide image information, for example digital information, relay optics to focus and transport the light of the image information to the display device and a display device that is viewable by the user's eyes 2. Head-mounted displays 10 can provide image information to one eye of the user or both eyes of the user. Head-mounted displays 10 that present image information to both eyes of the user can have one or two microprojectors 8. Monoscopic viewing in which the same image information is presented to both eyes is done with head-mounted displays 10 that have one or two microprojectors 8. Stereoscopic viewing typically requires a head-mounted display 10 that has two microprojectors 8.

The microprojectors 8 include image sources to provide the image information to the head-mounted display 10. A variety of image sources are known in the art including, for example, organic light-emitting diode (OLED) displays, liquid crystal displays (LCDs), or liquid crystal on silicon (LCOS) displays.

The relay optics can include refractive lenses, reflective lenses, diffractive lenses, holographic lenses or waveguides. For a see-through display the display should permit at least a partial view of the ambient environment or scene outside the head-mounted display 10 within the user's line of sight. Suitable displays known in the art in which a digital image is presented for viewing by a user include a device or surface including waveguides, polarized reflecting surfaces, partially reflecting surfaces, or switchable mirrors. The present invention concerns display devices that are useable as see-through displays and that are useable to present information to a user 20.

According to the present invention, the head-mounted display 10 includes a viewing area wherein at least a portion of the viewing area is a switchable viewing area 11 that is switched between a transparent state, an intermediate state, and an information state. In any of the states, information is projected and viewed by the user 20. In the information state, the viewed area is opaque, while in the transparent state, the viewed area is transparent in at least some portions of the viewing area. Thus, the transparent state enables the user 20 of the head-mounted display 10 to see at least portions of the ambient or real-world scene in front of the user 20. In contrast, the information state enables the user 20 to see projected digital images in at least portions of the viewing area. The intermediate state can be either opaque or transparent, or some combination of opaque and transparent, in different portions of the switchable viewing area 11.

As used herein, a transparent state is one in which the switchable viewing area 11 is apparently transparent to a viewer, for example having an absorption of less than 30%, less than 20%, or less than 10%, and for which any absorption is neutrally colored. Furthermore, a transparent state has negligible scattering, which is an amount of scattering that is not apparent to the user 20, for example having a scattering that is less than 10%, less than 5%, or less than 1%. Similarly, an opaque state is one in which the switchable viewing area 11 is apparently opaque to a viewer, for example having an absorption of greater than 70%, greater than 80%, or greater than 90%, or 100% and for which any absorption is neutrally colored. Furthermore, an opaque state can be reflective or be partially scattering.

In some embodiments of the present invention, the switchable viewing area 11 is a central region of the viewing area that is surrounded by a transparent area that is not switchable. In addition, in some embodiments of the invention, the switchable viewing area 11 includes multiple portions that are independently switchable.

Referring to FIG. 12, a method of operating a switchable head-mounted display 10 includes the steps of providing a head-mounted display 10 in step 100. The head-mounted display 10 includes a switchable viewing area 11 that is switched between a transparent viewing state and an information viewing state. The transparent viewing state is transparent with respect to the viewing area and enables a user 20 of the head-mounted display 10 to view the scene outside the head-mounted display 10 in the user's line of sight. The information viewing state is opaque with respect to the viewing area and displays information in the switchable viewing area 11 visible to the user 20 of the head-mounted display 10 to enable overlaid displayed information to be more easily distinguished in the switchable viewing area 11.

In one embodiment of the present invention, as illustrated in FIG. 12, the state of the switchable viewing area 11 is set to the information viewing state, the viewing state is then switched to an intermediate state, and then the viewing state is set to the transparent viewing state. In another embodiment of the present invention, the state of the switchable viewing area 11 can be set to the transparent viewing state, the viewing state is then switched to an intermediate state, and then the viewing state is set to the information viewing state. In yet another embodiment of the present invention, the state of the switchable viewing area 11 can be set to the information viewing state, the viewing state is then switched to an intermediate state, and then the viewing state is set back to the information viewing state. Alternatively, in another embodiment of the present invention, the state of the switchable viewing area 11 can be set to the transparent viewing state, the viewing state is then switched to an intermediate state, and then the viewing state is set back to the transparent viewing state.

In the example of FIG. 12, the switchable viewing area 11 is set to the information display state in step 105. Information can then be displayed in the switchable viewing area 11 in step 110 and the user 20 can view the information in step 115. In response to a stimulus, for example a manually operated switch, a detected voluntary or involuntary movement by the user 20 (e.g. step 120), or a change in the environment, for example an interruption or other environmental status change, the switchable viewing area 11 is set into the intermediate state in step 125. The head-mounted display 10 can then display, for example, overlaid information and real-world scenes, or portions thereof in step 130. However, the intermediate step is a transitional state and is then converted to a final state by setting the switchable viewing area 11 into the transparent state (step 135) in which the user 20 can view real-world scenes in step 140.

It is important to recognize that the intermediate state can differ from either the final information viewing or transparent states by the content of the imagery displayed in the display area. Hence, an intermediate state can be transparent with some transitional information displayed in the viewing area or an intermediate state can be an information viewing state with transitional information presented to a user. The transitional information can be a version of the information presented in the final state or the transitional digital information can include text explaining why the state was changed such as "environmental change detected".

The example of FIG. 12 can be reversed so that the switchable viewing area 11 is first placed in the transparent state, then into the intermediate state, and finally into the information viewing state.

Figure 13:
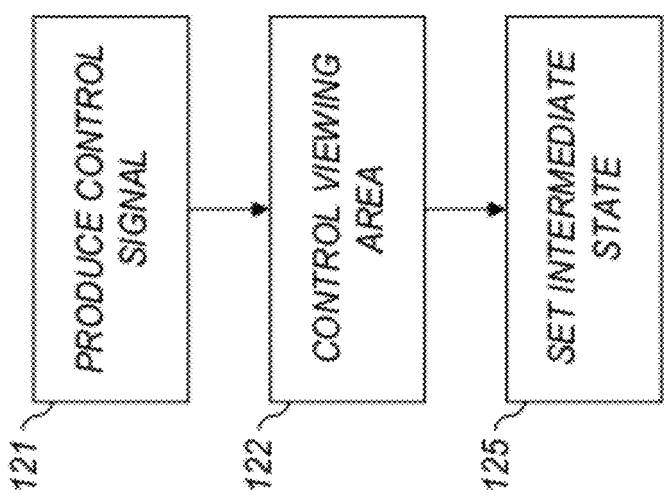
FIG. 13 is a flow chart illustrating a method according to an embodiment of the present invention.

As noted above, the switch from one state to another can be made in response to a stimulus, for example a movement by the user 20, such as an abrupt head rotation about a vertical axis (i.e. a user sharply turning his or her head). Referring to FIG. 13, a detection device can produce a control signal (step 121) that is applied to control the switchable viewing area 11 (step 122), to place the switchable viewing area 11 into the intermediate state (step 125). It is unnecessary to have another stimulus to change the switchable viewing area 11 from the intermediate state into a final state, although in one embodiment of the present invention a second stimulus can be used.

In an alternative embodiment, the process of switching into the intermediate state and then to the final state in response to a stimulus can continue automatically, either slowly or quickly, in one or several steps. The intermediate state can include multiple intermediate states that present information in different forms to the user, for example in a motion image sequence.

As is known in the art, use of head-mounted displays 10 can induce motion sickness in the user 20. Such motion sickness is avoided or mitigated by the use of intermediate viewing states according to various embodiments of the present invention. Motion sickness is prevalent whenever the user's physical movements do not correspond to the perceived movements of the user 20 induced by a viewed image.

In one embodiment of the present invention, information is panned across the switchable viewing area 11 as a part of the intermediate state. Referring to FIG. 4A, a head-mounted display apparatus 22 with the switchable viewing area 11 in a lens area 12 is in an initial information viewing state and the user 20 is facing straight ahead. FIGS. 5A to 5D show corresponding illustrations of representative combination images (similar to the lower portion of the illustrations in FIGS. 4A to 4E) as seen by the user 20 viewing the switchable viewing area 11. In FIGS. 5A-5D, the information is an image sequence (e.g. a movie or a video) that is panned to the left and exits the switchable viewing area 11 while a view of a real-world scene (represented by the text "Real-World Scene" in the Figures) is progressively presented to the viewer in the place of the information image sequence.

Referring to FIG. 4B, in response to an external stimulus, such as an interruption that takes place to the side of the user 20, detected by a detector that provides an external signal to the head-mounted display apparatus controller (not shown), the user 20 rotates his or her head and the information content (e.g. the movie) moves to a side of the switchable viewing area opposite the movement direction by panning the image across the viewing area exposing a portion 60 of the switchable viewing area 11 which is then switched to the transparent state, as illustrated by the new viewing area location of the word "Movie" in the illustration of FIG. 4B. Referring to FIG. 4C, the process of FIG. 4B is continued further. The user's head rotates further, the movie is further panned across the switchable viewing area 11 of the display, and the portion 60 of the switchable viewing area 11 correspondingly increases in width. Referring to FIG. 4D, the process of FIG. 4C is continued further again. The user's head rotates further, the movie is further panned across the viewing area of the head-mounted display 10, and the portion 60 correspondingly increases in width again. In FIG. 4D, an object 62 in the real-world scene in the user's line of sight appears. This object 62 is viewed by the user 20 at one side of the portion 60 of the switchable viewing area 11 which is in the transparent state. Finally, in FIG. 4E, the user 20 has rotated his or her head so that the object 62 is directly in front of him or her and the information is no longer presented in the switchable viewing area 11 while the entire display area is switched to the transparent state so that object 62 is directly viewed in the real-world scene by the user 20. In this example, the information is panned across the switchable viewing area 11 in a direction opposite to a movement by the user 20 of the head-mounted display 10. Furthermore, the rate at which the information is panned across a user's field of view can be matched to the rate of movement of the user 20 of the head-mounted display 10. Thus, the apparent location of the information is fixed relative to the real-world scene within the user's field of view, thereby mitigating motion sickness on the part of the user 20.

The process described with respect to the illustrations of FIGS. 4A-4E can be reversed so that the appearance of the switchable viewing area 11 will transition from FIG. 4E to FIG. 4A. In an alternative embodiment of the present invention, the process can extend only part-way, for example, the user 20 might rotate his or her head to the point illustrated in FIG. 4C and then return to the position illustrated in FIG. 4A.

In a further embodiment of the invention, the appearance of the switchable viewing area 11 and the image information presented will automatically transition back from FIG. 4E to FIG. 4A following an interruption after a predetermined period of time without the user 20 rotating his or her head in the opposite direction thereby again presenting the full image information to the user 20.

Figure 6A:
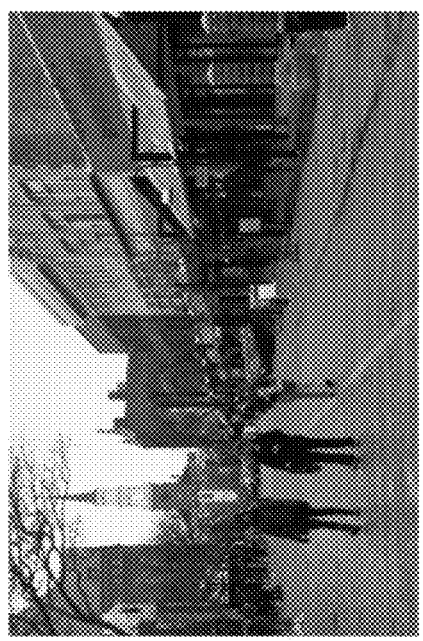
FIGS. 6A to 6D are successive illustrations of combined information and a real-world scene as seen by a user as the user's head rotates about a vertical axis according to another embodiment of the invention.
Figure 6B:
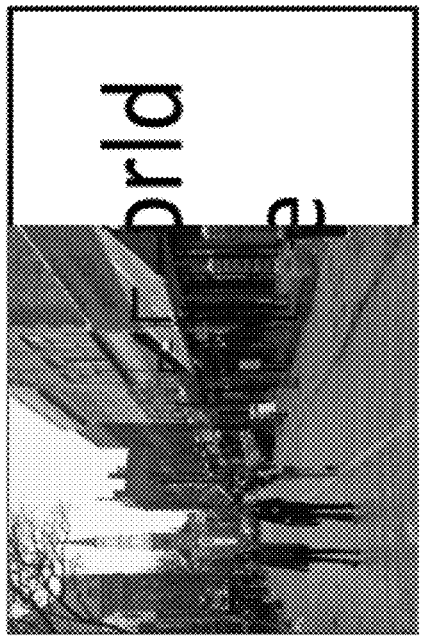
Figure 6C:
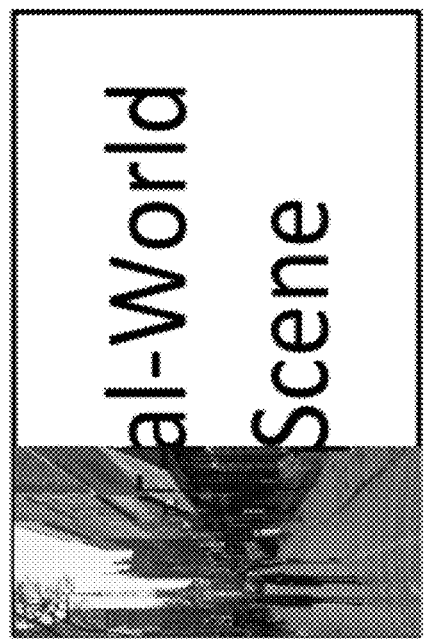
Figure 6D:
Figure 7A:
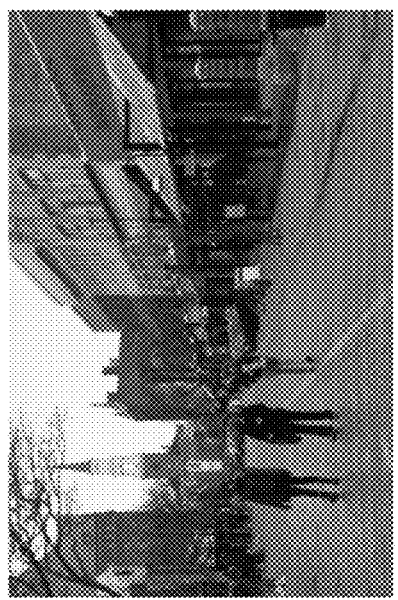
FIGS. 7A to 7D are successive illustrations of combined information and a real-world scene as seen by a user as the user's head rotates about a vertical axis according to an embodiment of the invention.
Figure 7B:
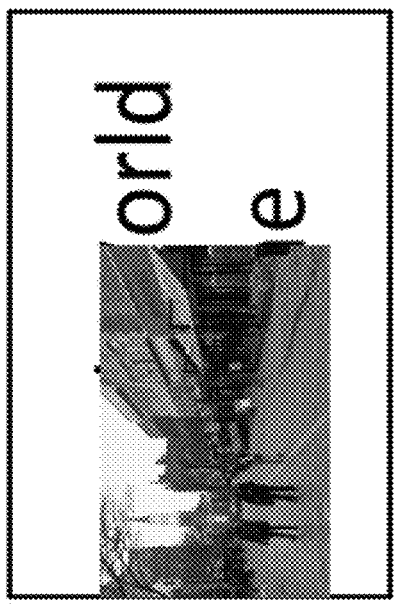
Figure 7C:
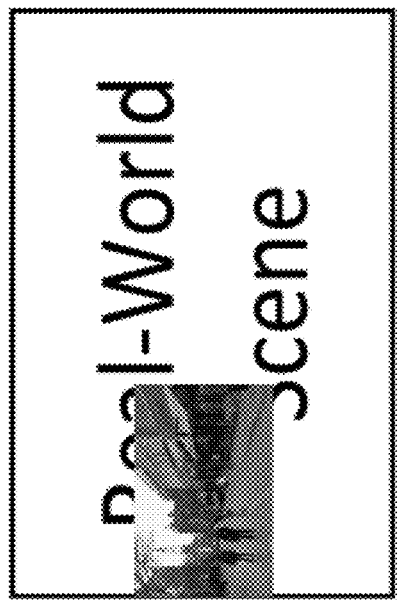
Figure 7D:
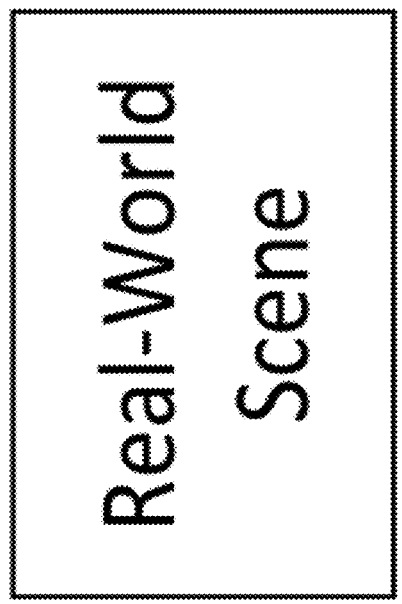
Figure 8C:
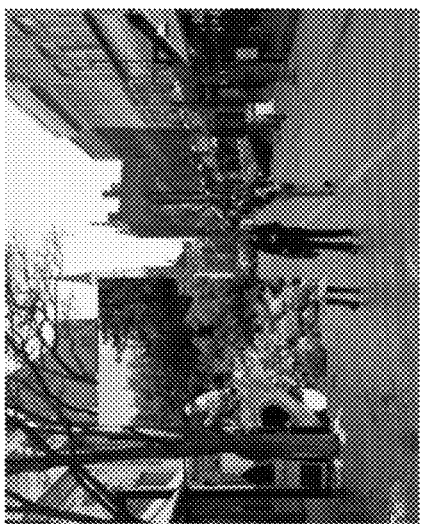
FIGS. 8A to 8E are successive illustrations of combined information and a real-world scene as seen by a user according to an alternative embodiment of the invention.
Figure 8B:
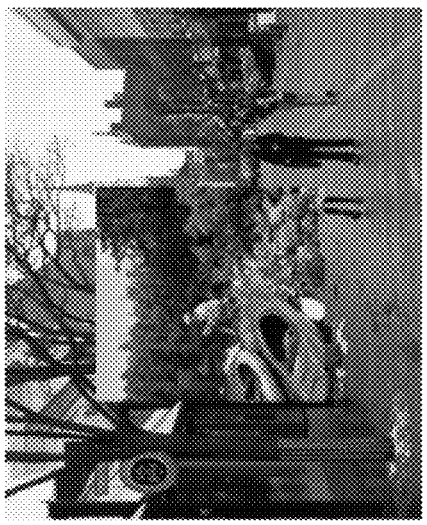
Figure 8A:
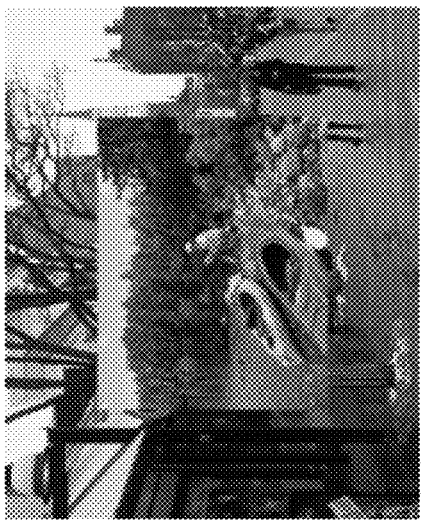
Figure 8E:
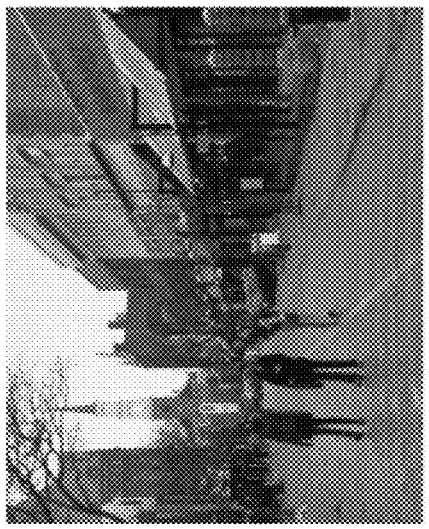
Figure 8D:
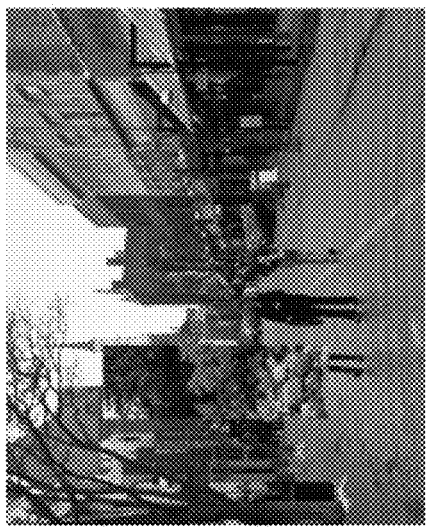
Figure 9C:
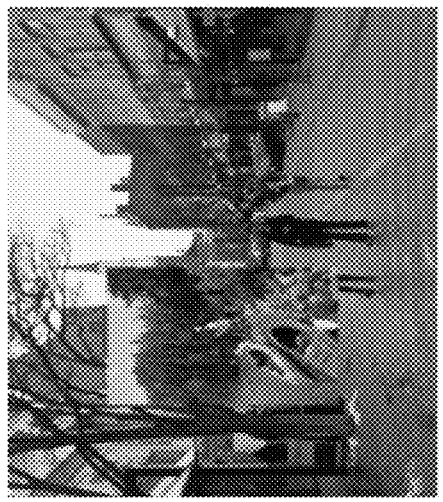
FIGS. 9A to 9E are successive illustrations of combined information and a real-world scene as seen by a user according to another embodiment of the invention.
Figure 9B:
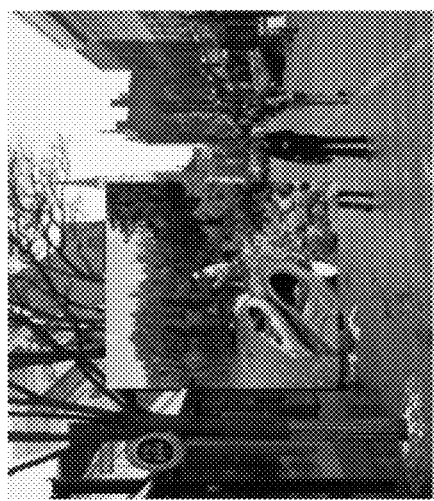
Figure 9A:
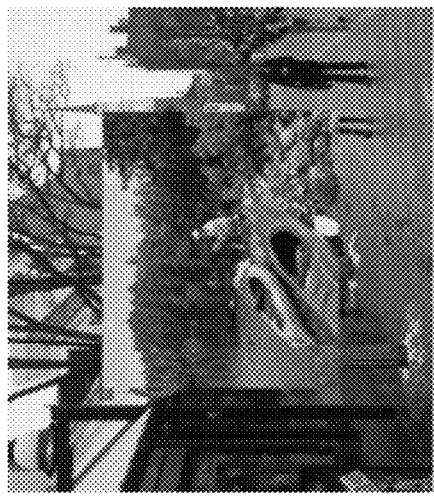
Figure 9E:
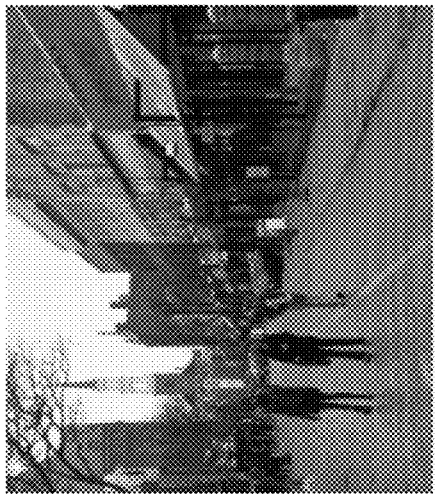
Figure 9D:
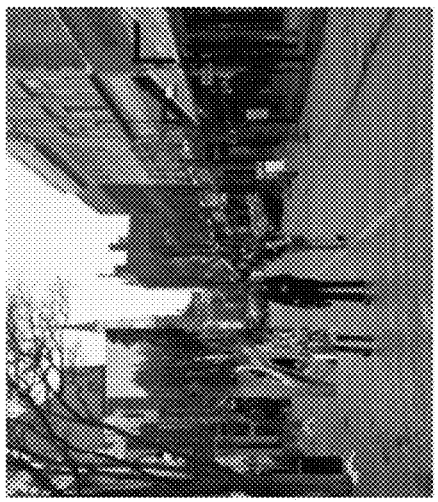

In an alternative embodiment of the present invention, the information panned across the viewing area is spatially compressed, so that the panned image appears to be squeezed in the direction of the pan, as shown in FIGS. 6A-6D. In FIGS. 6B and 6C, the image is linearly spatially compressed. Alternatively, the compression could be non-linear (not shown). In that case, it is preferred that the least compressed area of the information be located toward the center of the switchable viewing area 11. In yet another alternative embodiment of the present invention, illustrated in FIGS. 7A-7D, the information is reduced in resolution or made spatially smaller, so that the information takes up less and less space in the switchable viewing area 11. In a further embodiment of the present invention, as the information is made spatially smaller or reduced in resolution, the information is panned to the side of the switchable viewing area 11.

As noted above, the intermediate state can include multiple intermediate states. For example, FIGS. 4A, 5A, 6A, and 7A are in the information viewing state while FIGS. 4E, 5D, 6D, and 7D are in the transparent viewing state. The remaining states (i.e. FIGS. 4B-4D, 5B-5C, 6B-6C, and 7B-7C) are intermediate states.

In these examples, the information is moved completely out of the switchable viewing area 11. In other embodiments of the present invention, the information is only moved part of the way out of the switchable viewing area 11. Furthermore, the process can be interrupted so that information is moved part of the way out of the switchable viewing area 11 and then moved back in, for example to correspond to a movement of a user's head that stops and then returns to its former position.

In other embodiments of the present invention, the same processes can be used to move information into the switchable viewing area as has been illustrated for moving information out of the switchable viewing area, for example by reversing the illustrated steps in the Figures.

The rate at which the transition between states progresses can depend upon external factors, such as the movement of the user 20 or an external environmental change. Alternatively, the transition rate can be directly controlled by a controller 32 and set to one of many different rates, for example depending upon the application or tolerance of the user 20.

Information displayed in the switchable viewing area 11 can combine different images of information and the real-world scenes directly observed by the user 20, as illustrated in the examples. Referring to FIGS. 8A-8E, and 9A-9E, an inset scene can be reduced in size or compressed to transition from one state to another.

One state can be faded to another by controlling the brightness of information displayed or the transparency of the switchable viewing area 11, for example by controlling the switchable viewing area 11 to provide varying degrees of transparency. In this case, the switchable viewing area 11 intermediate state has opacity less than the opaque condition of the information viewing state and more than the transparent condition of the transparent viewing state. Furthermore, the brightness of the information display can be controlled to match the brightness of a real-world scene or, when transitioning from one state to another, the intermediate states can be controlled to provide a brightness that matches the real-world scene or transition from a real-world brightness to a desired information viewing brightness. As used herein, a real-world scene refers to a direct view of the physical world in a user's line of sight through a transparent portion of the switchable viewing area 11, i.e. what one would normally expect to see if the user was not wearing a head-mounted viewing apparatus.

Transitional intermediate states can also include information with a reduced sharpness or resolution or in which the area within the switchable viewing area 11 used to display information is reduced, possibly transitioning from all of the area to none of the area.

Transitions between states can take perceptible amounts of time so that users adjust to the change, thereby mitigating motions sickness. The perceptible amounts of time can be variable, can be pre-determined, can be based on environmental factors, or can be based on the status of the user 20.

In one embodiment of the present invention, the viewing area of the head-mounted display 10 includes the switchable viewing area 11 that includes a single switchable area that is switched from an opaque information state to a transparent state or vice versa. FIG. 10A shows a schematic diagram of the switchable viewing area 11 including a single area that is controlled with a single control signal from the controller 32 by control wires 35 to a transparent electrode 37 and a transparent backplane electrode 38 on the switchable viewing area 11. The transparent electrodes 37 and 38 are separated by an electrically responsive material 39 such as a liquid crystal pi cell layer, a polymer stabilized liquid crystal layer, a switchable reflective material layer or an electrochromic layer. The lens area 12 of the head-mounted display apparatus 22 is made entirely of the switchable area or alternately the lens area 12 includes a first portion that is a switchable area and a second portion that is not switchable and is transparent.

Figure 10C:
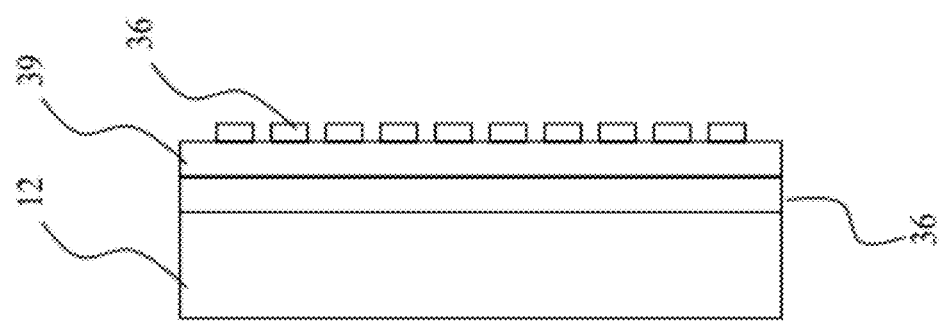

In another embodiment of the invention, the switchable viewing area 11 includes a series of rectangular regions that extend across the viewing area. FIG. 10B shows a schematic diagram of the lens area 12 having independently controllable potions of the switchable viewing area 11 that are controlled by the controller 32 and connected by a series of wires 34 connected to a series of rectangular transparent electrodes 36 arranged across the lens area 12 and a single backplane transparent electrode 38 connected with control wire 35. Again, the transparent electrodes 36 and 38 are separated by an electrically responsive material 39. FIG. 10C is a cross section of FIG. 10B taken across cross section line 33 and shown vertically. In this embodiment of the invention, each of the rectangular regions is switched independently. Transparent electrodes 36 are shaped in other ways to provide a variety of independently controllable switchable areas, for example to provide two-dimensional controllable areas. Control of such areas is known in the passive-matrix control display art, or the active-matrix display control art.

In operation, independently controllable portions 16 of the switchable viewing area 11 at the edge of the viewing area are switched from the information state to the transparent state by the controller 32 applying an appropriate electric field to the corresponding electrode at the edge of the display area. Thus, the portion 16 of the viewing area (corresponding to the right-most electrode in the display area) is switched into the transparent state as the user rotates his or her head slightly. The degree of rotation can be matched to the size of the portion 16 switched (portions 16 corresponding to more than one electrode can be switched).

FIGS. 11A to 11H illustrate successive stages of controlling a one-dimensional array of independently controllable portions 16 of the switchable viewing area 11 in the lens area 12 with the controller 32. In this illustration, spatially adjacent independently controllable portions 16 are successively switched to gradually change the switchable viewing area 11 from one state to another, for example to enable the transition from the information to the transparent state illustrated in FIGS. 4A-4E. In this embodiment, the controller 32 simultaneously controls one of the independently controllable portions 16 to be at least partially transparent while another of the independently controllable portions 16 is opaque. Furthermore, each of the independently controllable portions 16 is switched at a different time.

Figure 14:
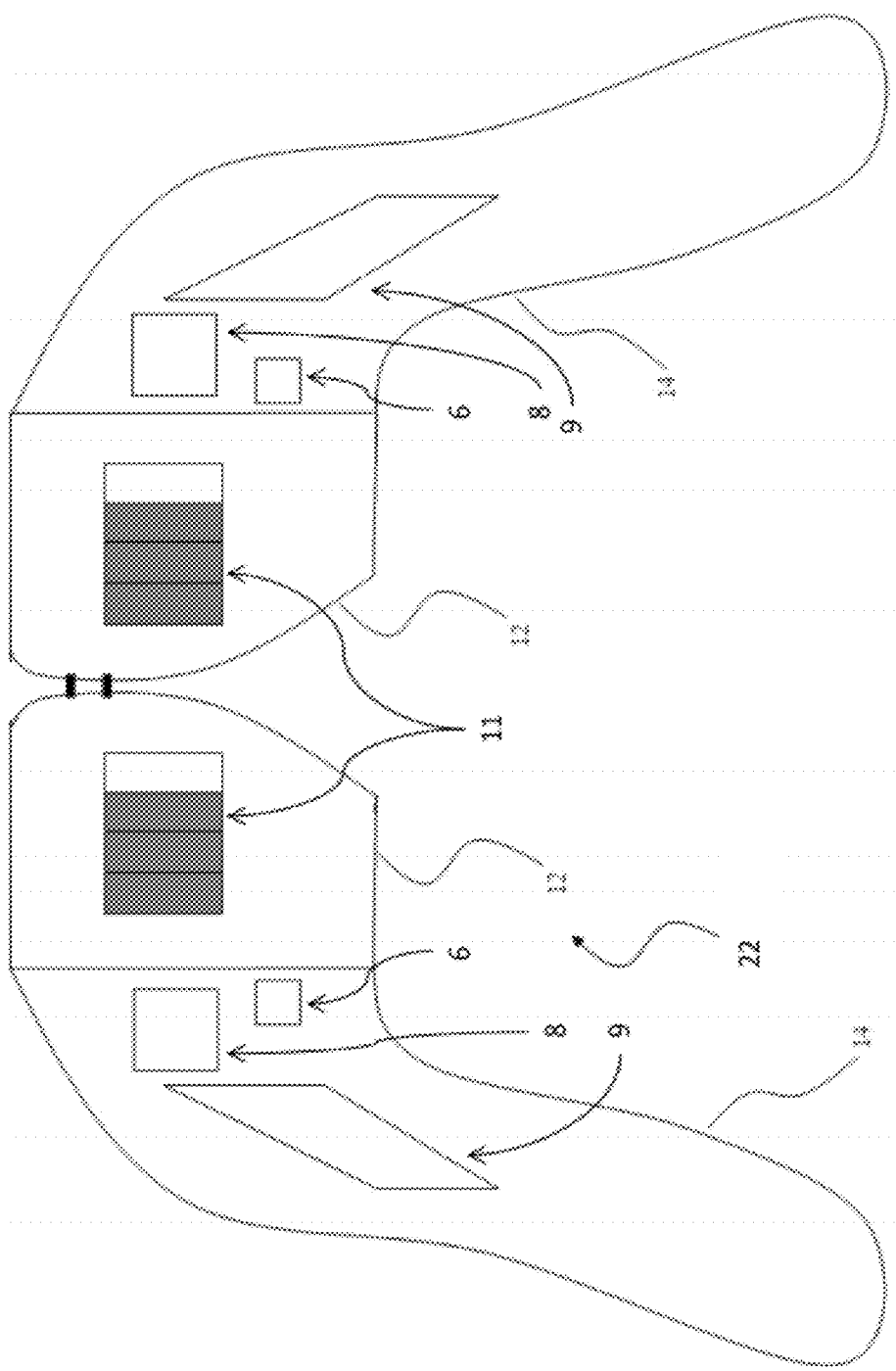
FIG. 14 is a schematic of a switchable head-mounted apparatus according to an embodiment of the present invention.

Referring to FIG. 14, in accordance with one embodiment of the present invention, the head-mounted display apparatus 22 includes the microprojector 8 and supporting earpieces 14 in a glasses- or helmet-mounted format, the head-mounted display apparatus 22 also including one or more lens areas 12 with portions of the switchable viewing area 11 that are switched between a transparent state and an information state. In the transparent state the switchable viewing area 11 is transparent and the user 20 of the head-mounted display apparatus 22 can view the ambient environment in front of the head-mounted display apparatus 22 in the user's line of sight. In the information state, the switchable viewing area 11 is opaque and digital image information is displayed in the region of the switchable viewing area 11 so the image information is visible to the user 20. In an embodiment of the invention, the viewing state of the switchable viewing area 11 automatically switches from the information state to the transparent state and vice versa, in response to an external stimulus notification. For example, an external stimulus is a stimulus detected by a stimulus detector 6 attached to the head-mounted display apparatus 22 or detected by an external sensor that is connected to the head-mounted display apparatus 22 either by wires or by wireless (not shown in FIG. 14). An external stimulus notification is provided by the control electronics 9 when the stimulus detector 6 indicates that a detectable change has occurred.

By providing a panning movement to the image information on the head-mounted display apparatus 22 in correspondence with the head motion and in an opposite direction, motion sickness is mitigated as the image information is fixed relative to the ambient environment as seen on the right edge of the image information shown in FIGS. 5A to 5D. The threshold at which a panning movement is deemed to occur is adjustable so that gradual head movements do not constitute an external stimulus notification which triggers a panning movement but more abrupt movements do. Thus, absolute position, relative position with respect to the body, or speed of movement can serve as external stimuli to trigger a switch in state to portions of the switchable viewing area 11 state.

In other embodiments of the present invention, the transition of portions 16 of the switchable viewing area 11 from the information state to the transparent state is made by fading from one state to the other or by an instantaneous switch, for example by controlling the transparency of the switchable viewing area 11. A gradual transition can be made by applying an analog control signal of increasing or decreasing value, for example by applying an increasingly strong electric field. Alternatively, a gradual transition can be made by applying a digital control signal, for example by using time-division multiplexing between a transparent state and an information state in which the switchable viewing area 11 is opaque.

In some embodiments, the type of transition of the switchable viewing area 11 from one state to another is based on detected external stimuli that trigger transitions from one state to another or based on an environmental attribute, for example the rate of transition is related to a measured brightness of the ambient environment. In another embodiment, the external stimulus can come from a timer so that a transition from one state to another occurs after a pre-determined time. Such an embodiment is particularly useful in switching from the transparent state to the information state. If users are interrupted in the viewing of image information, after the interruption and a switch to the transparent state, the head-mounted display apparatus 22 is returned automatically to the information state after a predetermined period of time.

In another example, a motion of the user's body is detected with an external stimulus detector that includes accelerometers and employed as the external stimulus. In an embodiment, the present invention includes a body-motion detector. The motion and orientation of the user's head is used to determine a corresponding panning movement of the image information across the switchable viewing area 11. For example, if the user 20 stands up or walks, it is useful to have at least a portion of the switchable viewing area 11 switch from the information state to the transparent state to enable the user to perceive his or her real-world surroundings to reduce motion sickness. In another example, the motion of the user's body is determined to be running the entire switchable viewing area 11 is then switched to the transparent state. Image information is presented in an augmented reality form with the head-mounted display apparatus 22 operating in a see-through fashion. Likewise, if the user 20 sits down or otherwise stops moving, it is useful to switch from the transparent state to the information state to enable the user to view information. Note that panning the information across the switchable viewing area 11 is done in a variety of directions, horizontally, vertically, or diagonally.

In one embodiment of the present invention, the image information is moved all of the way across the switchable viewing area 11. In another embodiment, the image information is moved only partway across the switchable viewing area 11. In this latter case, independently controllable portions 16 of the switchable viewing area 11 that switch between the information and transparent states permit a portion of the switchable viewing area 11 to be used to display information in the information state while another portion of the switchable viewing area 11 is in the transparent state and permits the user 20 to perceive real-world scenes in his or her line of sight in the transparent state portion. This is useful, for example, when a motion on the part of the user 20 would not naturally completely remove a portion of the real-world scene from the user's line of sight. For example, independently controllable portions 16 of the switchable viewing area 11 and the associated electrodes can divide the switchable viewing area 11 vertically into left and right portions or can divide the switchable viewing area 11 horizontally into top and bottom portions. The switchable viewing area 11 can also be operated such that a transparent portion is provided in the center of the switchable viewing area 11, to correspond most closely to the viewing direction of a user's line of sight.

In a further embodiment of the present invention, a plurality of adjacent independently controllable portions 16 of the switchable viewing area 11 can provide a spatially dynamic transition from one state to another by providing intermediate states to sequentially switch adjacent portions 16 from one edge of the switchable viewing area 11 across the switchable viewing area 11. Preferably, if the image information is moved across the switchable viewing area 11, the image information movement corresponds to the switching of the independently controllable portions 16 of the switchable viewing area 11 so that as the image information moves, the portions 16 of the switchable viewing area 11 from which the image information is removed are switched to the transparent state or the portions 16 into which image information is added are switched to the information state.

As will be readily appreciated, according to various embodiments of the present invention, the head-mounted display apparatus 22 and the switchable viewing area 11 can also be switched from a transparent state to an information state and then back to a transparent state. In other cases, the switched state is left active, according to the needs of the user 20.

A variety of external stimuli are employed to automatically switch between the information and transparent states. In one embodiment of the present invention, a movement on the part of the user 20, for example movement of the head or body, can provide the external stimulus detected by an external-stimulus detector 6 (FIG. 6) which can include: an inertial sensor, head tracker, accelerometer, gyroscopic sensor, magnetometer or other movement sensing technology known in the art. The external-stimulus sensor is mounted on the head-mounted display apparatus 22 or is provided externally. The sensors can provide the external stimulus notification.

The invention has been described in detail with particular reference to certain preferred embodiments thereof, but it will be understood that variations and modifications can be effected within the spirit and scope of the invention.

PARTS LIST 2 user's eye
3 partial reflectors
4 light rays passing from the microprojector
5 light rays from the ambient environment
6 stimulus detector
7 variable occlusion member
8 microprojector or image source
9 control electronics
10 head-mounted display apparatus
11 switchable viewing area
12 lens area
13 waveguide
14 ear pieces
16 independently controllable portion
20 user
22 head-mounted display apparatus
32 controller
33 cross section line
34 wires or buss
35 control wires
36 transparent electrodes
37 transparent electrode
38 transparent backplane electrode
39 electrically responsive material
60 portion of the switchable viewing area
62 object
100 provide HMD step
105 set information mode step
110 display information step
115 view information step
120 move head step
121 produce control signal step
122 control viewing area step 125 set intermediate state step
130 display information and real-world scene step
135 set transparent mode step
140 view real-world scene step

The invention claimed is:

1. A method of operating a switchable head-mounted display apparatus, including the steps of:
providing a head-mounted display, the head-mounted display including a switchable viewing area having independently controllable portions that is switched between a transparent viewing state and an information viewing state, wherein:
i) the transparent viewing state is transparent so that a user of the head-mounted display views at least a portion of the scene outside the head-mounted display in the user's line of sight; and
ii) the information viewing state is opaque and the user views information displayed in the switchable viewing area; and
switching the viewing state to an intermediate state from the transparent viewing state or the information viewing state by successively switching spatially adjacent independently controllable portions;
switching the intermediate state to the transparent viewing state or the information viewing state by successively switching spatially adjacent independently controllable portions; and
wherein the intermediate state is a state in which a portion of the switchable viewing area is in the information viewing state and a different portion of the switchable viewing area is in the transparent viewing state and in which information is displayed in the switchable viewing area over a smaller spatial area than the same information presented in the information state or the transparent viewing state.

2. The method of claim 1, further including the steps of:
producing a control signal for controlling the state of the switchable viewing area;
using a controller to control the switchable viewing area in response to the control signal; and
switching the head-mounted display from the transparent or the information state to the intermediate state or from the intermediate state to the transparent or the information state.

3. The method of claim 2, further including the step of producing the control signal in response to a movement by a user of the head-mounted display.

4. The method of claim 1, further including the step of panning information across the switchable viewing area as a part of the intermediate state.

5. The method of claim 4, further including the step of panning the information across the switchable viewing area in a direction opposite to a movement by a user of the head-mounted display.

6. The method of claim 5, wherein the rate of panning corresponds to the rate of movement by the user of the head-mounted display.

7. The method of claim 4, further including the step of panning the information across the switchable viewing area until the information is moved out of, or into, the switchable viewing area.

8. The method of claim 4, further including the step of spatially compressing or decompressing the information displayed in the switchable viewing area.

9. The method of claim 8, wherein the spatial compression or decompression is non-linear and the information is least compressed or decompressed toward the center of the switchable viewing area.

10. The method of claim 1, further including the step of switching between the information and the display state over a perceptible period of time.

11. The method of claim 10, wherein the perceptible period of time is pre-determined.

12. The method of claim 1, wherein the intermediate state includes a plurality of different combinations of images displayed in the transparent viewing state and the information display state.

13. The method of claim 12, wherein the plurality of different combinations of images provide a fade transition from the transparent viewing state to the information state or from the information state to the transparent viewing state.

14. The method of claim 1, wherein the intermediate state has brightness between the brightness of the information viewing state and the brightness of the transparent viewing state.

15. The method of claim 1, wherein in the intermediate state the switchable viewing area has an opacity less than the opaque condition of the information viewing state and more than the transparent condition of the transparent viewing state.

16. The method of claim 1, wherein the intermediate state is a state in which information is displayed in the switchable viewing area at a lower resolution than information that is presented in the information state or the transparent viewing state.

17. The method of claim 1, further including the steps of switching the switchable viewing area from the transparent viewing state into the intermediate state and then back to the transparent viewing state.

18. The method of claim 1, further including the steps of switching the switchable viewing area from the information viewing state into the intermediate state and then back to the information viewing state.

19. The method of claim 1, wherein the switchable viewing area has multiple portions that are independently controllable and the multiple portions are sequentially switched between states.

20. The method of claim 1, wherein the step of providing a head-mounted display further includes providing a viewing area that has a non-switchable portion and a portion that is the switchable viewing area.

21. A switchable head-mounted display apparatus, comprising:
a head-mounted display, the head-mounted display including a switchable viewing area having independently controllable portions that is switched between a transparent viewing state and an information viewing state, wherein:
i) the transparent viewing state is transparent so that a user of the head-mounted display views a portion of the scene outside the head-mounted display in the user's line of sight; and
ii) the information viewing state is opaque so that the user views the information in the switchable viewing area; and
a controller for switching the viewing state to an intermediate state from the transparent viewing state or the information viewing state by successively switching spatially adjacent independently controllable portions and for switching the intermediate state to the transparent viewing state or the information viewing state by successively switching spatially adjacent independently controllable portions; and wherein the intermediate state is a state in which a portion of the switchable viewing area is in the information viewing state and a different portion of the switchable viewing area is in the transparent viewing state and in which information is displayed in the switchable viewing area over a smaller spatial area than the same information presented in the information state or the transparent viewing state.

22. The switchable head-mounted display apparatus of claim 21, wherein the controller independently controls portions of the switchable viewing area.

23. The switchable head-mounted display apparatus of claim 21, further including a body motion detector.

24. The switchable head-mounted display apparatus of claim 21, further including a viewing area that has a non-switchable portion and a portion that is the switchable viewing area.

* * * * *